United States Patent
Johnson

[15] 3,697,154
[45] Oct. 10, 1972

[54] OPTICAL VIEWING SYSTEM

[72] Inventor: Frithiof V. Johnson, Binghamton, N.Y.

[73] Assignee: The United States of America as represented by the Secretary of the Navy

[22] Filed: May 12, 1971

[21] Appl. No.: 142,707

[52] U.S. Cl............350/174, 178/7.88, 178/DIG. 20, 350/55, 350/294
[51] Int. Cl..............................................G02b 27/14
[58] Field of Search...............350/174, 169, 294, 55; 178/DIG. 20, 7.85, 7.88, 7.89; 356/251, 252

[56] References Cited

UNITED STATES PATENTS

| | | | |
|---|---|---|---|
| 3,446,916 | 5/1969 | Abel et al............356/251 UX |
| 3,589,796 | 6/1971 | Schaefer.....................350/174 |
| 1,578,899 | 3/1926 | Lohmann.....................350/55 |
| 3,190,171 | 6/1965 | Reed............................350/55 |

Primary Examiner—David Schonberg
Assistant Examiner—John W. Leonard
Attorney—R. S. Sciascia, Henry Hansen and Gilbert H. Hennessey

[57] ABSTRACT

Images formed on the screen of a cathode ray tube (CRT) are reflected from a curved mirror having a general aspheric surface of revolution to a partially reflective combiner having two nonparallel hyperboloid surfaces. The combiner is positioned in the normal line of sight of an observer, for instance, in the windshield area of an aircraft cockpit. A collimated CRT image is reflected from the near surface of the combiner to the observer's eyes. The combiner is adapted to transmit light incident from the outside so that the CRT display is superimposed without parallax on the real world to provide a head-up display.

7 Claims, 4 Drawing Figures

PATENTED OCT 10 1972　　　　　　　　　　　　　3,697,154

INVENTOR.
FRITHIOF V. JOHNSON
BY Gilbert H. Hennessey
Henry Hansen
ATTORNEYS

INVENTOR.
FRITHIOF V. JOHNSON
BY
ATTORNEYS

OPTICAL VIEWING SYSTEM

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The invention relates generally to the fields of optics and display apparatus, and more particularly to improved collimated viewing systems using partially reflective combiners.

In flight situations requiring continuous attention and control, an aircraft pilot can be benefited by having the capability of simultaneously viewing flight instruments and the real world. For example, during landing it is ordinarily necessary to watch the runway while monitoring the attitude indicator to make sure that the airplane is in the proper orientation to make safe contact with the runway surface. In the past it has been necessary for a pilot to momentarily take his eyes off the runway, direct his vision to the instrument panel and refocus his eyes to read the instrument display. Rapid eye shifting can produce tension and fatigue and introduce errors in comprehension. The need for eye movement can be substantially eliminated by projecting a collimated image of the desired instrument display in the windshield area.

Various types of so-called head-up displays are currently under development by the aircraft industry. In all of these systems the essential component is called a combiner, usually a large optical element for transmitting outside light and simultaneously reflecting a parallel ray, collimated image of an illuminated instrument of a cathode ray tube display. Refocusing to view an instrument is unnecessary as the instrument display is superimposed directly on the real world image reaching the pilot.

A special military aircraft application for head-up displays is in superimposing an artificial gunsight on the outside world. The advantage gained is the elimination of parallax, thus freeing the pilot from head movement restraint.

In addition to collimation, the head-up display has several requirements which make optical design difficult. The larger the field of view included by the combiner element the more distortion is normally found near the limits of the field. The combiner itself, of course, must not interfere with the transmitted view of the real world. To meet these requirements many prior art head-up displays require complicated lens systems which contribute greatly to size, weight and cost. In fighter aircraft size is critical since equipment in the forward end of the cockpit can extend back only as far as the ejection path of the pilot's seat. Moreover, since brightness is important it is desirable to minimize the number of absorptive lenses in the system in favor of reflective surfaces. One previous approach used a single reflective surface but required a specially manufactured CRT tube having a costly curved phosphor screen.

SUMMARY OF THE INVENTION

Accordingly, the general purpose of the invention is to minimize distortion in a compact, wide angle, completely reflective head-up display. Another object of the invention is to improve the accuracy of a collimated CRT display. A further object of the invention is to minimize the number of optical elements required to produce a collimated partially reflected image of a standard CRT screen.

These and other objects of the invention are achieved by a two-element, reflective optical system using no image forming lenses. Light from the flat phosphorous screen of a standard CRT tube is reflected by a front surfaced aspheric mirror to an aspheric combiner glass. When installed in a cockpit, the surface of the combiner nearer to the pilot is a first hyperboloid having a partially reflective coating. The farther surface is a second hyperboloid, nonparallel to the first, having an antireflection coating. All three optical surfaces comprise portions of surfaces of revolution and are arranged about a common axis. The combiner surface farther from the pilot is formed to minimize distortion of the transmitted real world image. In another embodiment of antireflection coating is omitted from the farther surface of the combiner and its aspheric surface is designed to superimpose CRT rays on those reflected from the near surface in addition to minimizing real world distortion. In place of the standard CRT screen a less preferred spherical screen is illustrated in use with the invention.

DESCRIPTION OF THE PREFERRED EMBODIMENTS

Figure 1:
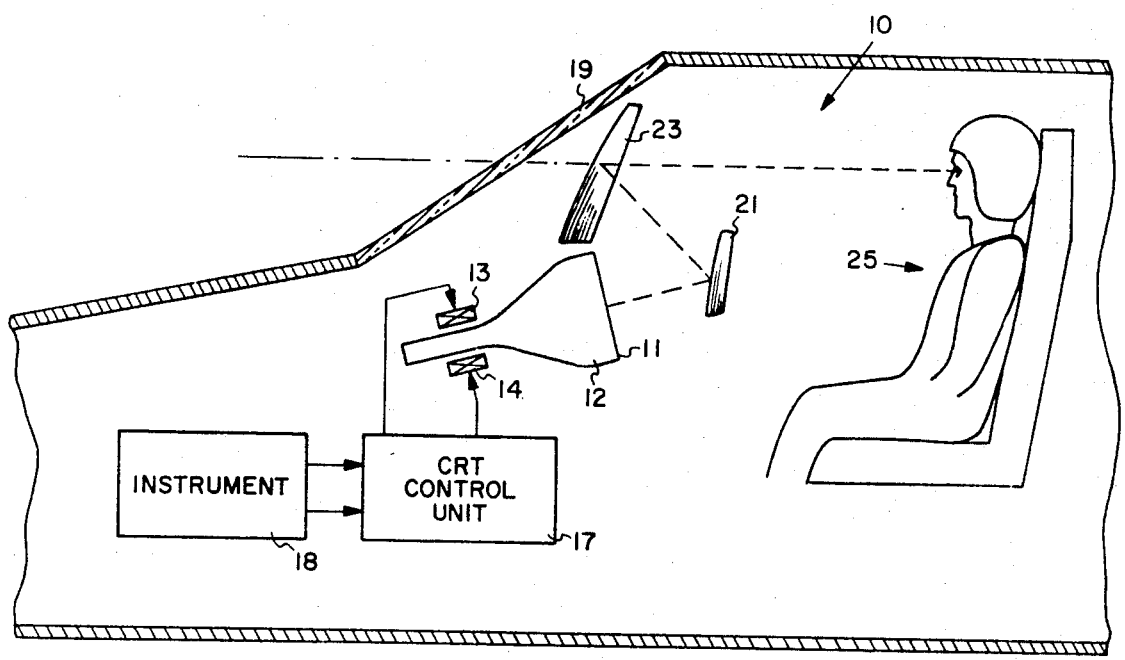
FIG. 1 is a schematic and block diagram of a typical arrangement of the collimated viewing system in an aircraft cockpit.

Referring now to FIG. 1 of the drawings, the pertinent features of an aircraft cockpit are shown generally at 10. At the forward end of cockpit 10 a standard cathode ray tube (CRT) 12 is positioned having a typical phosphor screen 11 and horizontal and vertical deflection yokes 13 and 14 driven by CRT control unit 17 to display the output of a suitable aircraft instrument 18. For example, an electronically simulated attitude indicator could be displayed on screen 11 to indicate changes in the aircraft's orientation. The image displayed on screen 11 is reflected from an aspheric mirror 21 to a partially reflective aspheric combiner 23 located in front of the cockpit windshield 19. CRT 12, mirror 21 and combiner 23 are arranged such that a seated pilot 25 can simultaneously view the reflected image of CRT 12 and the outside world transmitted through windshield 19 and combiner 23.

Figure 3:
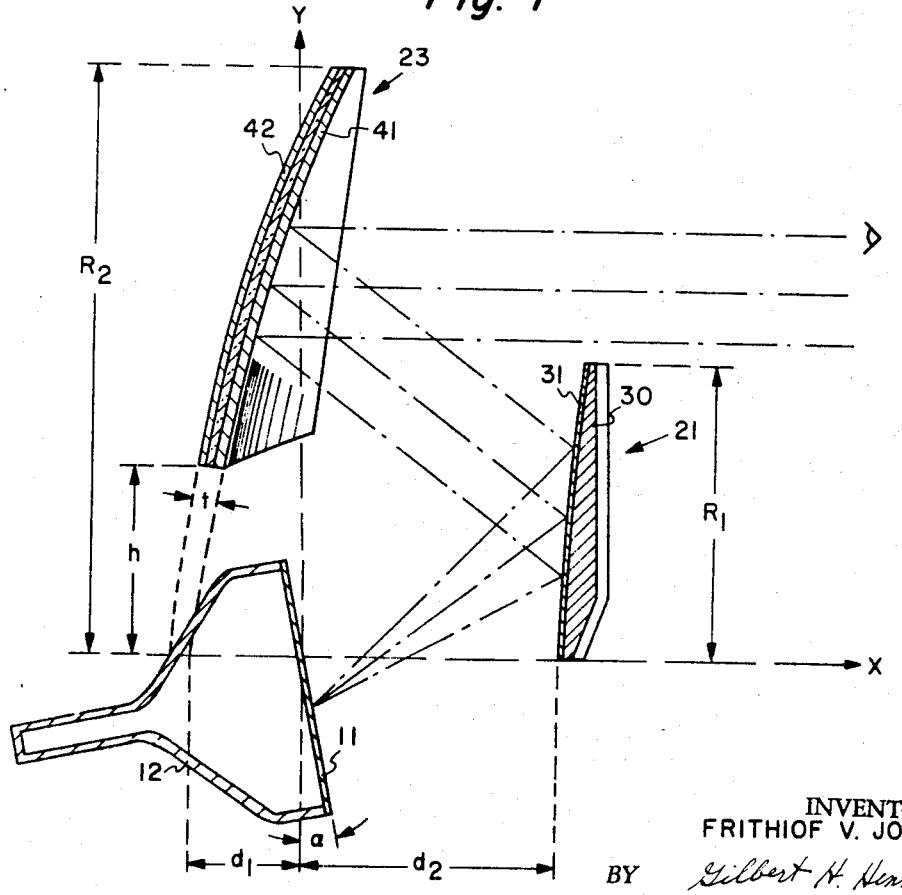
FIG. 3 is a cross-sectional view of the optical elements taken along lines 3—3 in the direction of the arrows in FIG. 2.
Figure 2:
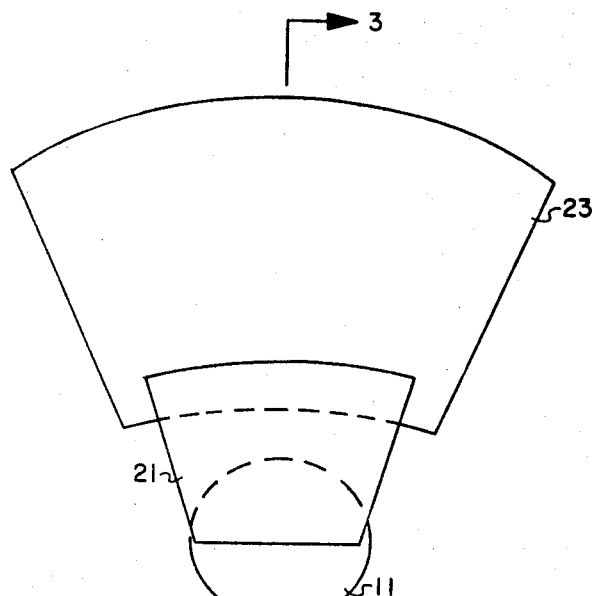
FIG. 2 is a plan view of the optical elements of the viewing system of FIG. 1 from the observer's side.

Referring now to FIGS. 2 and 3, CRT screen 11, mirror 21 and combiner 23 are designed to collimate or make parallel the light rays from screen 11 so that the image produced by CRT 12 appears to be coming from infinity as light from a distant source would. With respect to the horizontal and vertical reference axes, dashed lines $x$ and $y$ in FIG. 3, screen 11 is mounted on the $x$-axis perpendicular to the $x$—$y$ plane and tilted slightly counterclockwise from the vertical by an angle $\alpha$ made with the $y$-axis. The tilt angle $\alpha$ is determined by ray tracing to minimize the weighted root mean squared parallax errors over a defined ensemble of ray directions and head positions. The weightings are determined by the assumed probability of each head position from which images would normally be viewed. Screen 11, of course, is situated in the focal plane defined by mirror 21 and combiner 23. Mirror 21 may comprise a solid, opaque body portion 30 provided with a front surface having a totally reflective coating 31. Surface 31 is a general aspheric surface of revolution about the $x$-axis. Mirror 21 would typically be made in a large dish form from which the mirror section 21, shown in FIG. 2, would be cut. It should be noted that for mirror 21 only portions of the curve above a horizontal plane containing the $x$-axis are required.

The front and back surfaces of combiner 23 are formed from different curves. Front surface 41 is coated with a partially reflective material, such as aluminum. Surface 42 is a hyperboloid, having different dimensions, coated with a hard antireflection material, such as magnesium fluoride, to force transmission of CRT image rays which pass unreflected through surface 41 and real world rays which are reflected rather than transmitted by surface 41. The body of combiner 23 between surfaces 41 and 42 may be formed from a transparent material such as glass or clear plastic. Like mirror 21 combiner 23 may be manufactured first in a dish form from which the desired section may be cut as shown in FIG. 2. Again only a portion above the $x$-axis is utilized. A portion of height $h$ above the $x$-axis is excluded from the cut section of combiner 23 because it would normally be obscured from view by mirror 21.

A typical system designed according to the invention had the following specifications given below in Table 1 with reference to FIG. 3:

TABLE I

Surface 41, $x = (1.5106448y^2 + 26.57099^2)^{1/2} - 26.57099$;
Surface 42, $x = (1.5065y^2 + 26.6082^2)^{1/2} - 26.6082$;
Surface 31, $x = -0.00342035y + 0.0418094y^2 - 0.00761052y^3 + 0.000468966y^4$;
Screen 11, plane surface with $\alpha = 11\text{-}\frac{1}{2}°$ tilt, center at $x = 0, y = 0$, useful diameter 5.25;
$R_1 = 4.8$; $R_2 = 9.5$; $h = 3$; $t = 0.26$; $d_1 = 1.70224$; $d_2 = 4.34565$;
Reflectivity of surface 41 = 25 percent;
typical central eye position of observer, $x = 25, y = 7.0$;
where all indicated dimensions are in inches.

In the embodiment shown in FIG. 3 surface 42 is free to be designed with respect to transmission of images from a distant scene. It is an important feature of the invention that surfaces 41 and 42 are nonparallel. If, as in certain prior art designs, combiner 23 were strictly flat, it would not matter if surfaces 41 and 42 were parallel. However, if the surfaces are both cured and parallel, horizontal light rays from the real world passing through the top of combiner 23 would be refracted slightly upward, instead of passing undeviated, by the combined action of surfaces 41 and 42. For a given ray near the top of combiner 23, the normal to surface 42 at the point of incidence would not be parallel to the normal to surface 41 at the point of exit, if curved surfaces 41 and 42 were parallel. These two normals can be made approximately parallel for rays near the top of combiner 23 by selecting a different hyperboloid for surface 42. This is exemplified by the specific design spedifications above where the coefficients for the hyperboloid of surface 42 differ slightly from those for surface 41. Those skilled in the art will recognized that the refraction of transmitted real world rays can be lessened by reducing the thickness of combiner 23. Manufacturing cost rises significantly, however, for very thin optical elements. The quarter inch thickness appears to be an acceptable compromise. It is thin enough to reduce the accuracy with which surface 42 must be ground.

Since surface 42 is purely transmissive there are only two optical surfaces used to produce the collimated CRT image, that is, surfaces 31 and 41. These two surfaces are generated explicitly to satisfy simultaneously two requirements. The first and most important is that all rays entering the combiner parallel to the $x$-axis in the meridian plane (the plane of the cross section in FIG. 3) must be reflected to converge at the center of screen 11. The second requirement is that rays making the same small angle $\beta$ with the $x$-axis, whether in the meridian plane or in a plane normal to the meridian plane, must intersect screen 11 at the same distance from its center. That is, the meridional and lateral magnifications must be identical. While other desirable optical requirements may be stated, with two surfaces only two requirements can be explicitly satisfied.

Figure 4:
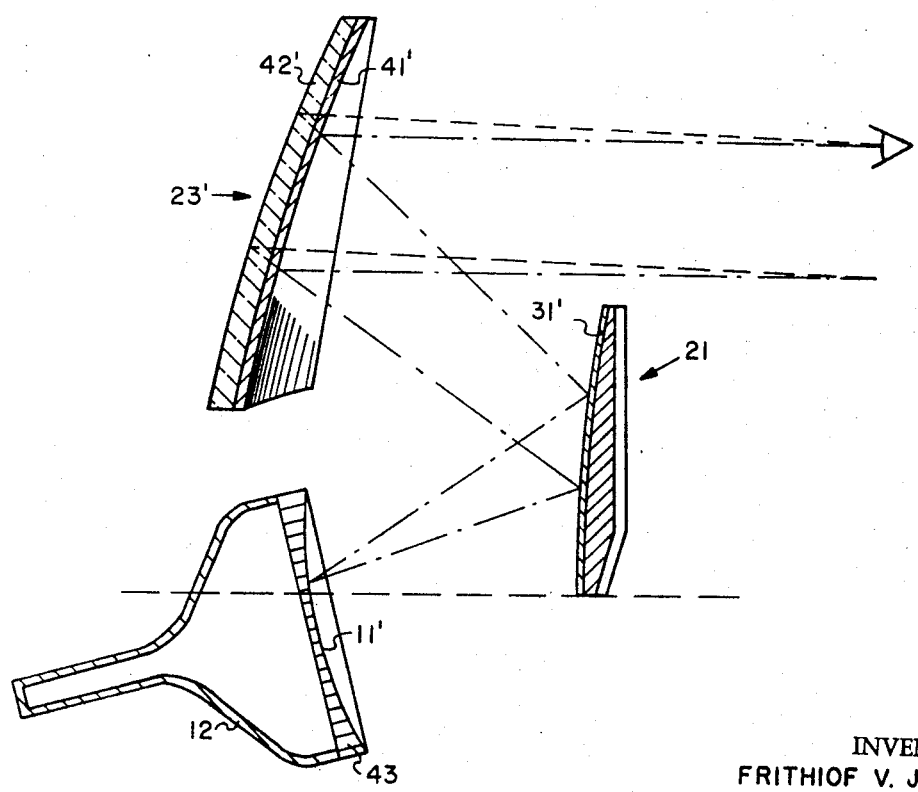
FIG. 4 is a cross-sectional view of another embodiment of the invention illustrating certain modifications to the arrangement of FIG. 3.

In the alternate embodiment of FIG. 4 two independent variations are shown, either or both of which could be included in the design of FIG. 3. By altering the curve of surface 42, a surface 42' can be generated which will superimpose reflected CRT rays on those reflected from coated surface 41'. Although the accurate transmission of real world images must be compromised to a small extent, the principal advantage of designing surface 42' to superimpose CRT reflection is that the anti-reflection coating may be omitted reducing cost and providing increased ruggedness of the system.

The ideal surface, that is the calculated curvature, for the screen of CRT 12 is a sphere of radius 6.75 inches in the design specified above. If in FIG. 3 screen 11 were replaced by screen 11', its equation in the specific example would be $(x - 6.70)^2 + (y - 0.835)^2 = (6.75)^2$, the sphere's geometric center being located at $x = 6.70$ inches, $y = 0.835$ inches. A spherical surface such as 11' can be provided by using a fiber optic face plate 43 ground to the desired contour. Instead of fiber optics a field flattener, single concave lens could also be used to create an apparent surface. Since face plates add considerably to the cost of the CRT and lenses add weight and complexity and absorb light, the use of the preferred standard flat screen 11, as in FIG. 3, was investigated as an approximation of the ideal surface 11' and found to be acceptable since negligible distortion was introduced. The criticality of the exact curvature of screen 11' was far less than that of surfaces 31' and 41' due to the overall design of the system.

An important feature of the invention is that it can use any standard, commercially available CRT of suitable quality. Due to high optical efficiency of the invention, the CRT display may be operated at low brightness permitting higher resolution (thinner lines) and substantially increasing tube life. A small number of optical elements is used to reduce light losses by absorption and scattering. Because all elements of the design comprise surfaces of revolution about a single axis, they are manufacturable by advanced but existing types of generating machinery well known in the art.

The optical system has been shown and described in the aircraft environment only for illustration of one of its most practical applications. It will be understood that many other situations exist where the invention's capability of superimposing artifical images on a distant background has utility.

Optical designers familiar with head-up displays will recognize that other specific designs for mirror 21 and combiner 23 can be generated by known computer techniques to accommodate increases or decreases in system size and field angle requirements. A viewing system constructed according to Table I resulted in an instantaneous total field of view having a width of about 22°, much higher than any known prior art display of comparable size, accuracy and brightness. For locations up to 4 inches from the central eye position the measured optical errors were less than 3 milliradians for the central 10° field, less than 6 milliradians for the annular 10° to 20° field, and less than 8 milliradians for the 20° to 22° annular field. At the central eye position the errors were 0.6, 1.8 and 5.2 milliradians respectively.

It will be understood that various changes in the details, materials, steps and arrangements of parts, which have been herein described and illustrated in order to explain the nature of the invention, may be made by those skilled in the art within the principle and scope of the invention as expressed in the appended claims.

What is claimed is:

1. A viewing system comprising a beam combiner element positioned in the normal line of sight of an observer, said combiner having a
   transparent body provided with a convex aspheric outer surface and a concave partially reflective aspheric inner surface, said inner and outer surfaces being sections of surfaces of revolution about a first axis below and substantially parallel to the line of sight;
   said inner surface being a section of a hyperboloid and being shaped to collimate rays of light coming from a mirror element, said mirror element having a convex aspheric reflecting surface of revolution about said first axis facing said combiner inner surface and spaced therefrom along said first axis; and
   a display screen positioned on said first axis opposite said mirror at the focal plane of said combiner and mirror surfaces, whereby light from the display screen is reflected by the convex mirror toward the combiner, and collimated by the combiner and reflected toward the observer.

2. An optical system according to claim 1 further comprising: said combiner outer surface being a section of a second hyperboloid different from said first hyperboloid.

3. An optical system according to claim 2 further comprising:
   said mirror surface being a sectioned aspheric surface above a first plane, including the first axis, perpendicular to a second plane substantially defined by the first axis and the line of sight.

4. An optical system according to claim 3 further comprising:
   said screen being disposed on the intersection of the first axis and a second axis orthogonal thereto and lying in the second plane, said screen extending perpendicularly to the second plane and tilted by an angle $\alpha$ with respect to said second axis, a geometrical extension of said combiner inner surface crossing said first axis at a distance $d_1$ behind said screen, and a geometrical extension of said mirror surface crossing said first axis at a distance $d_2$ in front of said screen.

5. An optical system according to claim 4 further comprising:
   said combiner inner surface having a cross-sectional profile in the second plane defined in relation to the first and second axes, designated $x$ and $y$ axes respectively as
   $x = (1.5106448y^2 + 26.57099^2)^{1/2} - 26.57099$, the dimensions being in inches; and
   said mirror surface having a cross-sectional profile similarly defined as
   $x = 0.00342035y + 0.0418094y^2 - 0.00761052y^3 + 0.000468966y^4$.

6. An optical system according to claim 5 further comprising:
   said combiner outer surface having a cross-sectional profile similarly defined as
   $x = (1.5065y^2 + 26.6082^2)^{1/2} - 26.6082$, said combiner element having an average thickness of about a quarter inch.

7. An optical system according to claim 6 further comprising: said screen having a spherical surface similarly defined as
   $(x - 6.70)^2 + (y - 0.835)^2 = 6.75^2$.

* * * * *